United States Patent
Washino et al.

(10) Patent No.: US 6,929,494 B2
(45) Date of Patent: Aug. 16, 2005

(54) CONNECTOR

(75) Inventors: Kiyoshi Washino, Kanagawa (JP); Satoru Kihira, Kanagawa (JP)

(73) Assignee: J.S.T. Mfg, Co., Ltd., Osaka (JP)

( * ) Notice: Subject to any disclaimer, the term of this patent is extended or adjusted under 35 U.S.C. 154(b) by 0 days.

(21) Appl. No.: 10/885,633

(22) Filed: Jul. 8, 2004

(65) Prior Publication Data

US 2005/0032431 A1 Feb. 10, 2005

(30) Foreign Application Priority Data

Jul. 18, 2003 (JP) ........................................ 2003-199393

(51) Int. Cl.$^7$ ............................................. H01R 13/62
(52) U.S. Cl. ..................................... 439/326; 439/630
(58) Field of Search ................................. 439/326, 630, 439/862

(56) References Cited

U.S. PATENT DOCUMENTS

| | | | |
|---|---|---|---|
| 6,511,350 B1 | * | 1/2003 | Ito et al. ...................... 439/680 |
| 6,607,404 B1 | * | 8/2003 | Ito et al. ...................... 439/630 |

FOREIGN PATENT DOCUMENTS

| | | |
|---|---|---|
| JP | 09-312184 A | 12/1997 |
| JP | 10-091737 A | 4/1998 |
| JP | 2000-215952 A | 8/2000 |
| JP | 2000-259780 A | 9/2000 |

\* cited by examiner

*Primary Examiner*—Tho D. Ta
(74) *Attorney, Agent, or Firm*—Rader, Fishman & Grauer PLLC (57) ABSTRACT

The present invention relates to a connector which is electrically connected to a memory card. The connector includes a substantially cylindrical housing and plural elastically deformable contacts inside the housing. The housing includes a card insertion slot which is cut and formed on one end side thereof and an abutting portion which is provided on the other end side of the card insertion slot. The plural contacts are provided in positions opposed to the card insertion slot and extend toward the other end side of the housing and the abutting portion. A gap between the distal ends of the plural contacts and the abutting portion is set smaller than a thickness of the memory card. According to the present invention, when the memory card is inserted in the card insertion slot and a proximal end side of the memory card is inclined to the other end side of the housing, a distal end of the memory card slides on surfaces of the contacts. Thus, even if the memory card is mishandled, damage to the contacts can be prevented.

4 Claims, 7 Drawing Sheets

CONNECTOR

CROSS-REFERENCE TO RELATED APPLICATIONS

This application is based upon and claims the benefit of priority from the prior Japanese Patent Application No.2003-199393 filed on Jul. 18, 2003, the entire contents of which is incorporated herein by reference.

FIELD OF THE INVENTION

The present invention relates to a connector which is electrically connected to a memory card such as an SD (Secure Digital) memory card or a multimedia card (hereinafter referred to as MMC).

BACKGROUND OF THE INVENTION

Conventionally, a memory card, which is a card type storage, is known.

This memory card adopts a flash memory as a storage medium. Thus, the memory card is small-sized, hardly consumes electric power for reading out and writing data, and does not require a driving device unlike disk type storages such as a flexible disk (FD) and a magneto-optical disk (MO).

Therefore, the memory card is widely spread as a storage medium for portable apparatuses such as a digital camera, a cellular phone with camera, a PDA (Personal Digital Assistant), a note type personal computer, and a portable music player.

Incidentally, the memory card had a small storage capacity and was expensive compared with the disk type storages such as a flexible disk (FD) and a magneto-optical disk (MO). However, the storage capacity of the memory card has been increased to about 128 MB at the maximum as the technology has made progress in recent years. In addition, in accordance with the spread of the portable apparatuses with the memory card, the memory card has been produced in large quantities. As a result, a price of the memory card has fallen.

The memory card is connected to a connector mounted on the portable apparatuses. As such a connector, a popup type connector, in which a memory card can be inserted easily, is known (see, for example, JP-A-2000-259780).

JP-A-2000-259780 discloses an IC card inserting device equivalent to the connector of the present invention. This IC card inserting device includes: a planar holder for being inserted in and pulled out from a housing of an apparatus; an elastic conductor which is provided on this holder; and a connector which is provided on the holder for rotating freely. The elastic conductor has a pair of leaf spring members with different heights.

According to this IC card inserting device, after memory cards are inserted in the connector on the holder, this connector is rotated to dispose the memory cards in a state in which the memory cards are inclined with respect to a surface of the holder. In this state, the memory cards are supported by the elastic conductor and partially overlap each other on the holder.

Thereafter, when the holder is inserted in the housing of the apparatus, the respective memory cards are pushed against the elastic conductor on the holder and connected to an electrode portion. At the same time, the respective memory cards are held in the housing.

Therefore, according to the IC card inserting device, since the IC card inserting device can be formed in a planar shape, a reduction in height for the apparatus can be realized.

However, although a reduction in size and a reduction in height for a portable apparatus are demanded, it is difficult to apply the IC card inserting device of JP-A-2000-259780 to the portable apparatus because the structure of the IC card inserting device is complicated.

In order to solve this problem, a connector 2A having a structure as described below has been proposed.

Figure 5:
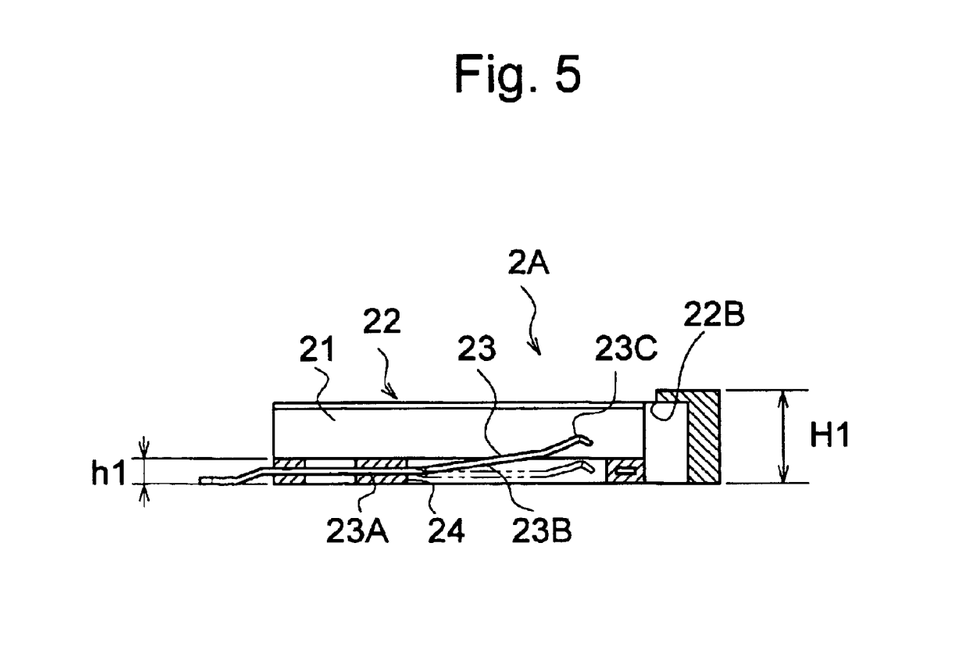
FIG. 5 is a sectional view of a connector in accordance with a first conventional example.

FIG. 5 is a sectional view of the connector 2A in accordance with a first conventional example.

The connector 2A is mounted on a printed board incorporated in an apparatus, and a memory card is electrically connected to the connector 2A.

The connector 2A includes a substantially rectangular cylindrical housing 21 and plural elastically deformable contacts 23 which are provided inside the housing 21.

In the housing 21, a card insertion slot 22, which is cut and formed at one end side of the housing 21, an abutting portion 22B, which is provided on the other end side of the housing 21 of the card insertion slot 22, and a contact housing portion 24, which is cut and formed to be opposed to the card insertion slot 22, are formed. A thickness of the contact housing portion 24 is assumed to be h1.

Each of the plural contacts 23 includes a fixed portion 23A which is supported in the contact housing portion 24 and an elastic portion 23B which extends from the fixed portion 23A to the other end side of the housing 21 and the abutting portion 22B.

The fixed portion 23A is supported on one end side of the housing 21 among edges of the contact housing portion 24.

A projection 23C of an arc shape is formed at a distal end of the elastic portion 23B. A gap is formed slightly between a distal end of the projection 23C and an inner wall surface of the housing 21. In addition, a gap between the projection 23C of the contact 23 and the abutting portion 22B is larger than a thickness of a memory card 1.

Next, an operation of the connector 2A for holding the memory card 1 will be explained with reference to FIGS. 6A to 6D.

First, the memory card 1 is inserted in the card insertion slot 22. Next, a proximal end side of the memory card 1 is inclined to one end side of the housing 21. Then, the contact 23 is pressed by the memory card 1 to be elastically deformed and housed in the contact housing portion 24. Consequently, the memory card 1 is held between the contact 23 and the abutting portion 22B. As a result, the memory card 1 is connected to the contact 23.

Therefore, according to this connector 2A, a connector can be easily constituted and a reduction in height therefore can be realized.

Next, an operation of the connector 2A in the case of mishandling the memory card 1 will be explained with reference to FIGS. 6A to 6D.

Figure 6:
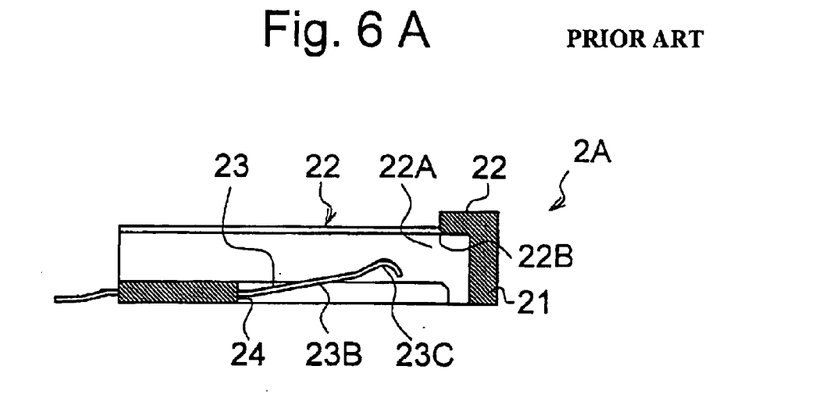
FIG. 6A is a perspective view showing a state before a memory card in accordance with the conventional example is inserted in the connector.
FIG. 6B is a perspective view showing a state in which the memory card in accordance with the conventional example is inserted in the connector.
FIG. 6C is a perspective view showing a state in which the memory card in accordance with the conventional example is inserted in the connector and being inclined to the other end side of a housing.
FIG. 6D is a perspective view showing a state in which the memory card in accordance with the conventional example is inserted in the connector and inclined to the other end side of the housing.

First, the memory card 1 is inserted in the card insertion slot 22 in a state shown in FIG. 6A. Then, as shown in FIG. 6B, since the gap between the projection 23C of the contact 23 and the abutting portion 22B is larger than the thickness of the memory card 1, the memory card 1 comes into a loosely fit state. Next, when this memory card 1 is inclined to the other end side of the housing 21 by mistake, as shown in FIGS. 6C and 6D, the distal end of the memory card 1 is caught in the projection 23C of the contact 23 and presses the contact 23 toward the one end side of the housing 21 to deform the contact 23 exceeding an elastic limit. As a result, the contact 23 is likely to be broken.

Figure 7:
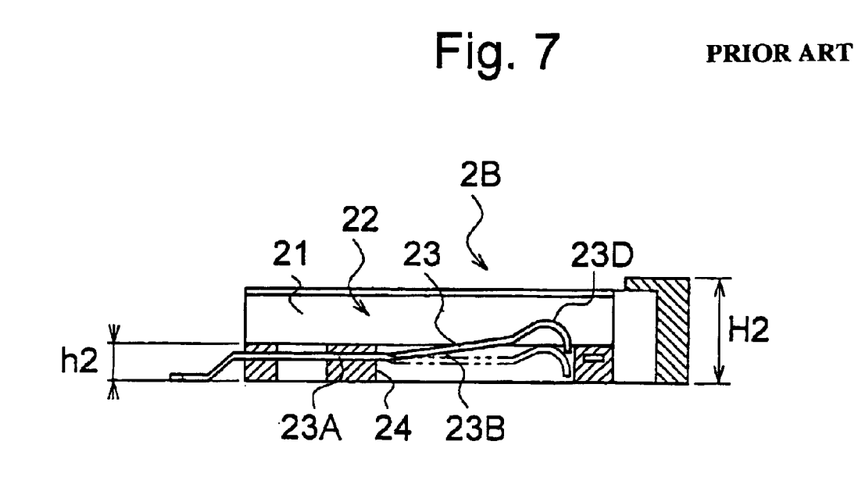
FIG. 7 is a sectional view of a connector in accordance with a second conventional example.

Thus, in order to solve such a problem, a connector 2B as shown in FIG. 7 has been proposed.

In the connector 2B, a projection 23D of the contact 23 has a shape obtained by extending the projection 23C of an arc shape of the contact 23 along a circumferential direction thereof. In other words, a distal end of the projection 23D is in the contact housing portion 24 of the housing 21.

Therefore, since the projection 23D is not separated from the inner wall surface like the projection 23D, the distal end of the memory card 1 can be prevented from being caught in the contact 23.

However, in the connector 2B, a thickness of the projection 23D of the contact 23 increases. Thus, it is necessary to set the thickness of the contact housing portion 24 to h2 which is larger than h1. Therefore, it is necessary to set a height of the connector 2B to H2 which is larger than H1, and it is difficult to realize the reduction in height for the connector.

SUMMARY OF THE INVENTION

In order to solve the above-mentioned problems, it is an object of the present invention to provide a connector which realizes a reduction in height therefor with a simple structure and prevent damage to a contact even if a memory card is mishandled.

In order to attain the object, the inventor has devised a new connector as described below.

(1) A connector for being electrically connected to a memory card, comprising: a substantially cylindrical housing; plural elastically deformable contacts inside the housing; wherein the housing includes: a card insertion slot which is cut and formed on one end side thereof; and an abutting portion which is provided on the other end side of the card insertion slot; wherein the plural contacts are provided in positions opposed to the card insertion slot and extend toward the other end side of the housing and the abutting portion; a gap between distal ends of the plural contacts and the abutting portion is smaller than a thickness of the memory card; whereby the contacts are elastically deformed and the memory card is held between the contacts and the abutting portion when the memory card is inserted in the card insertion slot and a proximal end side of the memory card is inclined to the one end side of the housing; and whereby the distal end of the memory card slides on surfaces of the contacts when the memory card is inserted in the card insertion slot and the proximal end side of the memory card is inclined to the other end side of the housing.

The memory card is a card having a substrate and a memory chip provided on a surface of the substrate. For example, the memory card may have a structure in which connection terminals are disposed on a distal end side of the card. As the memory card, for example, there are an SD card and an MMC.

Note that the connector has a popup structure in which, when the memory card is inserted in the card insertion slot, the distal end of the memory card is biased by the distal end of the contact.

As the connector, for example, plural contacts may be disposed in a row to form a single line connector. The housing may have an insulating property.

The contact is a cantilever supported on one end side thereof by the housing and may be formed of a leaf spring. In addition, the number of contacts corresponds to the number of poles of connection terminals provided in the memory card. More specifically, for example, in the case of the SD card, contacts are arranged in nine poles, and in the case of the MMC, contacts are arranged in seven poles.

The contact may include, for example, a fixed portion which is fixed to the housing and an elastic portion which extends toward the abutting portion from the fixed portion. The fixed portion may be pressed into the housing or may be fixed by a molding.

According to the invention of (1), when a memory card is inserted in the card insertion slot and the memory card is inclined to the one end side of the housing, the contacts are elastically deformed, and the memory card is held between the contacts and the abutting portion. Consequently, the memory card and the connector are electrically connected.

On the other hand, when a memory card is inserted in the card insertion slot and a proximal end side of the memory card is inclined to the other end side of the housing, a distal end of the memory card slides on the surfaces of the contacts. Therefore, even if the memory card is mishandled, damage to the contact can be prevented.

In addition, since the connector includes the housing and the contacts, the connector can be constituted by a simple structure.

In addition, since the gap between the distal ends of the plural contacts and the abutting portion is made smaller than a thickness of a memory card, even if the memory card is mishandled, a distal end of the memory card is prevented from being caught at the distal end of the contact. Thus, since a thickness of the distal end of the contact can be reduced, a reduction in height for the connector can be realized.

(2) A connector described in (1), in which the distal end of the contact is formed in an arc shape in section.

(3) A connector described in (1) or (2), in which the distal end of the contact is formed in hemisphere.

(4) A connector described in any one of (1) to (3), in which the memory card is a multimedia card.

DETAILED DESCRIPTION OF THE PREFERRED EMBODIMENT

An embodiment of the present invention will be hereinafter explained with reference to the accompanying drawings. Note that, in explaining the embodiment, identical components are denoted by identical reference numerals and signs, and repeated explanations of the components will be omitted or simplified.

Figure 1A:
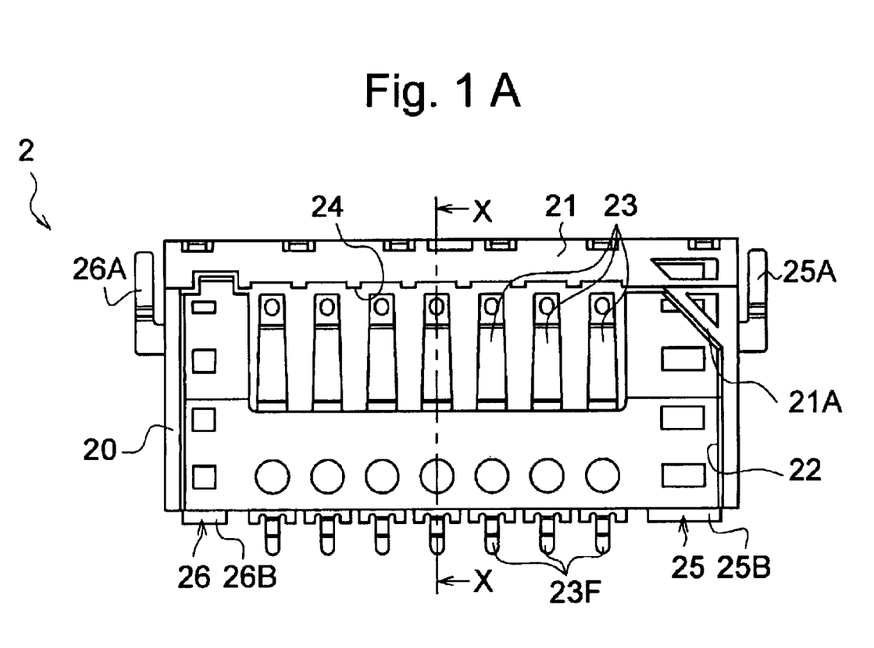
FIG. 1A is a plan view of a connector in accordance with an embodiment of the present invention.
Figure 1B:
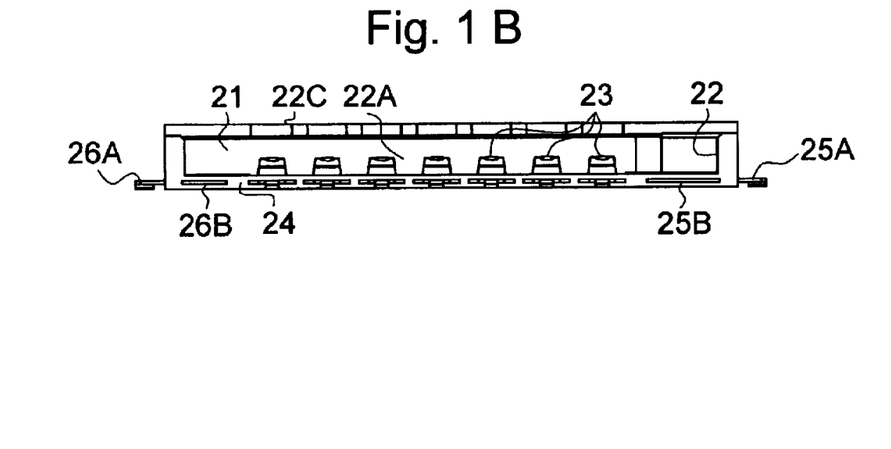
FIG. 1B is a front view of the connector in accordance with the embodiment.
Figure 1C:
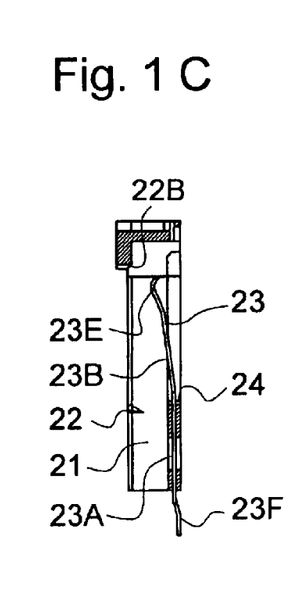
FIG. 1C is a sectional view along line X—X in FIG. 1A.
Figure 2:
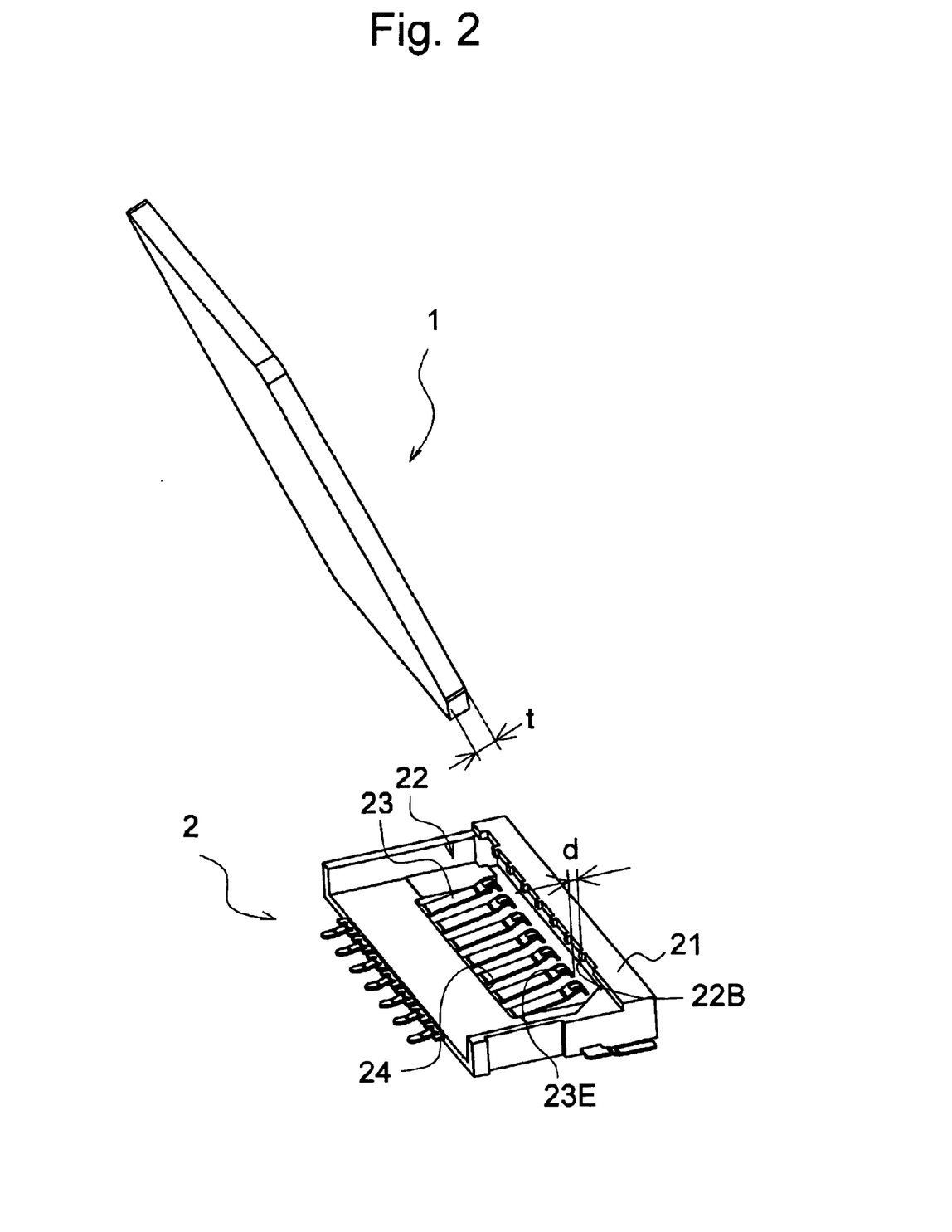
FIG. 2 is a perspective view of the connector and a memory card in accordance with the embodiment.

FIG. 1A is a plan view of a connector 2 in accordance with an embodiment of the present invention. FIG. 1B is a front view of the connector 2, and FIG. 1C is a sectional view along line X—X in FIG. 1A. FIG. 2 is a perspective view of the connector 2 and a memory card 1.

The connector 2 is mounted on a printed board incorporated in an apparatus, and the memory card is electrically connected to the connector 2. The connector 2 includes a substantially rectangular cylindrical insulating housing 21 and plural elastically deformable contacts 23 which are provided inside the housing 21.

The memory card 1 has a thickness t and includes a substrate and a connection terminal provided at a distal end of the substrate.

The housing 21 includes: a card insertion slot 22 which is cut and formed on one end side thereof; an abutting portion 22B which is provided on the other end side of the card insertion slot 22; and a contact housing portion 24 which is cut and formed to be opposed to the card insertion slot 22. A thickness of the contact housing portion 24 is assumed to be h3.

In addition, fixed portions 25, 26 are incorporated in the housing 21. The fixed portions 25, 26 include joining tabs 25A, 26A which are exposed from a front surface of the housing 21 and joining tabs 25B, 26B which are exposed from both sides of the housing 21.

These joining tabs 25A, 25B, 26A, 26B are soldered to a fixing land of a printed board on which the connector 2 is mounted.

Each of the plural contacts 23 includes a fixed portion 23A which is supported by the contact housing portion 24 and an elastic portion 23B which extends to the other end side of the housing 21 and the abutting portion 22B from the fixed portion 23A.

The fixed portion 23A is supported on one end side of the housing 21 among edges of the contact housing portion 24.

A projection 23E of an arc shape is formed at a distal end of the elastic portion 23B. A gap d is formed between a distal end of the projection 23E and the abutting portion 22B of the housing 21. This gap d is larger than the thickness t of the memory card 1.

A projection 21A is formed at one corner of the card insertion slot 22. The memory card 1 is cut corresponding to the projection 21A.

Consequently, even if a user attempts to insert the memory card 1 misunderstanding the front and the back thereof in the card insertion slot 22, the memory card 1 is caught in the projection 21A of the card insertion slot 22 and cannot be inserted.

Next, an operation for attaching the memory card 1 to the connector 2 will be explained with reference to FIGS. 3A to 3D.

Figure 3A:
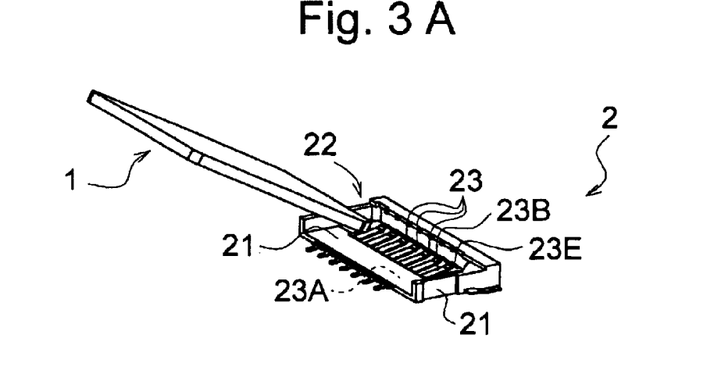
FIG. 3A is a perspective view showing a state before the memory card in accordance with the embodiment is inserted in the connector.
Figure 3B:
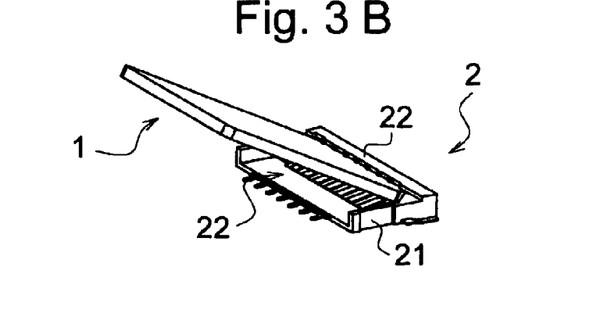
FIG. 3B is a perspective view showing a state in which the memory card in accordance with the embodiment is inserted in the connector.

First, as shown in FIG. 3B, the memory card 1 is inserted in the card insertion slot 22 in a state shown in FIG. 3A. Consequently, the connection terminals of the memory card 1 and the contacts 23 can be positioned.

Figure 3C:
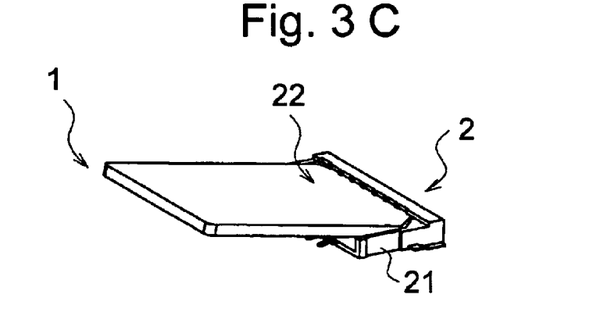
FIG. 3C is a perspective view showing a state in which the memory card in accordance with the embodiment is inserted in the connector and inclined to one end side of a housing.
Figure 3D:
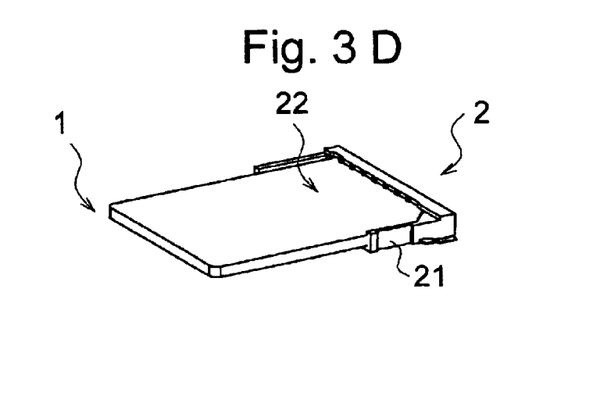
FIG. 3D is a perspective view showing a state in which the memory card in accordance with the embodiment is held by the connector.

Next, as shown in FIGS. 3C and 3D, a proximal end side of the memory card 1 is inclined to the one end side of the housing 21. Then, the contacts 23 are pressed by the memory card 1 to be elastically deformed and housed in the contact housing portion 24. Consequently, the memory card 1 is held between the contacts 23 and the abutting portion 22B. As a result, the memory card 1 is connected to the contact 23.

Therefore, according to this connector 2, a connector can be constituted easily, and a reduction in height of the connector can be realized.

Next, an operation in the case in which the memory card 1 is mishandled in the connector 2A will be explained with reference to FIGS. 4A to 4D.

Figure 4:
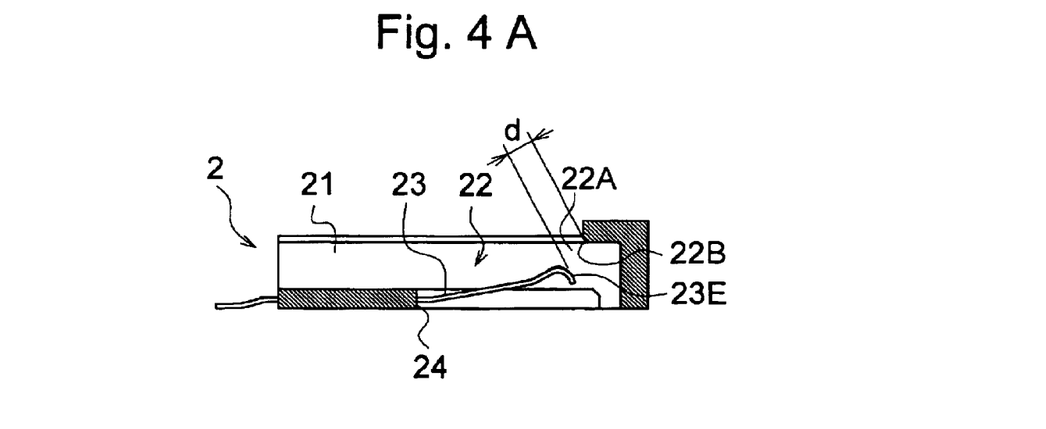
FIG. 4A is a sectional view showing a state before the memory card in accordance with the embodiment is inserted in the connector.
FIG. 4B is a sectional view showing a state in which the memory card in accordance with the embodiment is inserted in the connector.
FIG. 4C is a sectional view showing a state in which the memory card in accordance with the embodiment is inserted in the connector and being inclined to the other end side of the housing.
FIG. 4D is a sectional view showing a state in which the memory card in accordance with the embodiment is inserted in the connector and inclined to the other end side of the housing.

First, as shown in FIG. 4B, the memory card 1 is inserted in the card insertion slot 22 in a state shown in FIG. 4A. Then, since the gap d between the projection 23E of the contact 23 and the abutting portion 22B is smaller than the thickness t of the memory card 1, the memory card 1 is not in engagement with the projection 23E. Next, when this memory card 1 is inclined to the other end side of the housing 21 by mistake, the distal end of the memory card slides on surfaces of the contacts 23. Therefore, even if the memory card 1 is mishandled, damage to the contacts 23 can be prevented.

Note that the memory card 1 can be inserted in the connector 2 if the proximal end side of the memory card 1 is inclined to the one end side of the housing 21 in all the states of FIGS. 4B to 4D.

According to the present invention, the connector has advantages as described below.

When a memory card is inserted in a card insertion slot of the connector and a proximal end side of the memory card is inclined to one end side of a housing, contacts are elastically deformed and the memory card is held between the contacts and an abutting portion. Consequently, the memory card and the connector are electrically connected.

On the other hand, when a memory card is inserted in the card insertion slot and a proximal end side of the memory card is inclined to the other end side of the housing, a distal end of the memory card slides on surfaces of the contacts. Therefore, even if the memory card is mishandled, damage to the contacts can be prevented.

In addition, since the connector includes the housing and the contacts, the connector can be constituted with a simple structure.

Further, a gap between distal ends of the plural contacts and the abutting portion is set smaller than a thickness of the memory card, whereby, even if the memory card is mishandled, the distal end of the memory card is prevented from being caught in the distal ends of the contacts. Thus, since a thickness of the distal ends of the contacts can be reduced, a reduction in height for the connector can be realized.

What is claimed is:

1. A connector for being electrically connected to a memory card, comprising:

a substantially cylindrical housing;

plural elastically deformable contacts inside the housing;

wherein the housing includes: a card insertion slot which is cut and formed on one end side thereof; and an abutting portion which is provided on the other end side of the card insertion slot;

wherein the plural contacts are provided in positions opposed to the card insertion slot and extend toward the other end side of the housing and the abutting portion;

a gap between distal ends of the plural contacts and the abutting portion is smaller than a thickness of the memory card;

whereby the contacts are elastically deformed and the memory card is held between the contacts and the abutting portion when the memory card is inserted in the card insertion slot and a proximal end side of the memory card is inclined to the one end side of the housing; and whereby the distal end of the memory card slides on surfaces of the contacts when the memory card is inserted in the card insertion slot and the proximal end side of the memory card is inclined to the other end side of the housing.

2. A connector according to claim 1, wherein the distal ends of the contacts are formed in an arc shape in section.

3. A connector according to claim 1 or 2, wherein the distal ends of the contacts are formed in hemisphere.

4. A connector according to claim 1 or 2, wherein the memory card is a multimedia card.

* * * * *